United States Patent [19]
Pepin

[11] 3,805,256
[45] Apr. 16, 1974

[54] NEW TEMPERATURE SONDE

[75] Inventor: Theodore John Pepin, Laramie, Wyo.

[73] Assignee: The United States of America as represented by the Secretary of the Navy, Washington, D.C.

[22] Filed: Dec. 19, 1972

[21] Appl. No.: 316,634

[52] U.S. Cl. .......................... 340/208, 340/177 VA
[51] Int. Cl. ............................................ G08c 19/12
[58] Field of Search .......... 340/208, 207 R, 177 VA

[56] References Cited
UNITED STATES PATENTS
2,992,120  7/1961  Elsken ................................ 340/208
3,475,742  10/1969  Whitney ........................... 340/207 R Primary Examiner—Thomas B. Habecker
Attorney, Agent, or Firm—R. S. Sciascia; R. J. Miller

[57] ABSTRACT

The invention disclosed herein relates to an improved temperature sensing device of the radio sonde type and more particularly includes a bead thermistor remotely mounted from the housing containing unique circuitry for telemetering measured temperature by frequency modulating the output of the transmitter tube by utilizing the variable resistance characteristics of the thermistor in the current circuit for charging a capacitor that is automatically discharged when a given voltage is reached. Included within the circuitry is a flip-flop circuit for frequency modulating the broadcast frequency.

4 Claims, 4 Drawing Figures

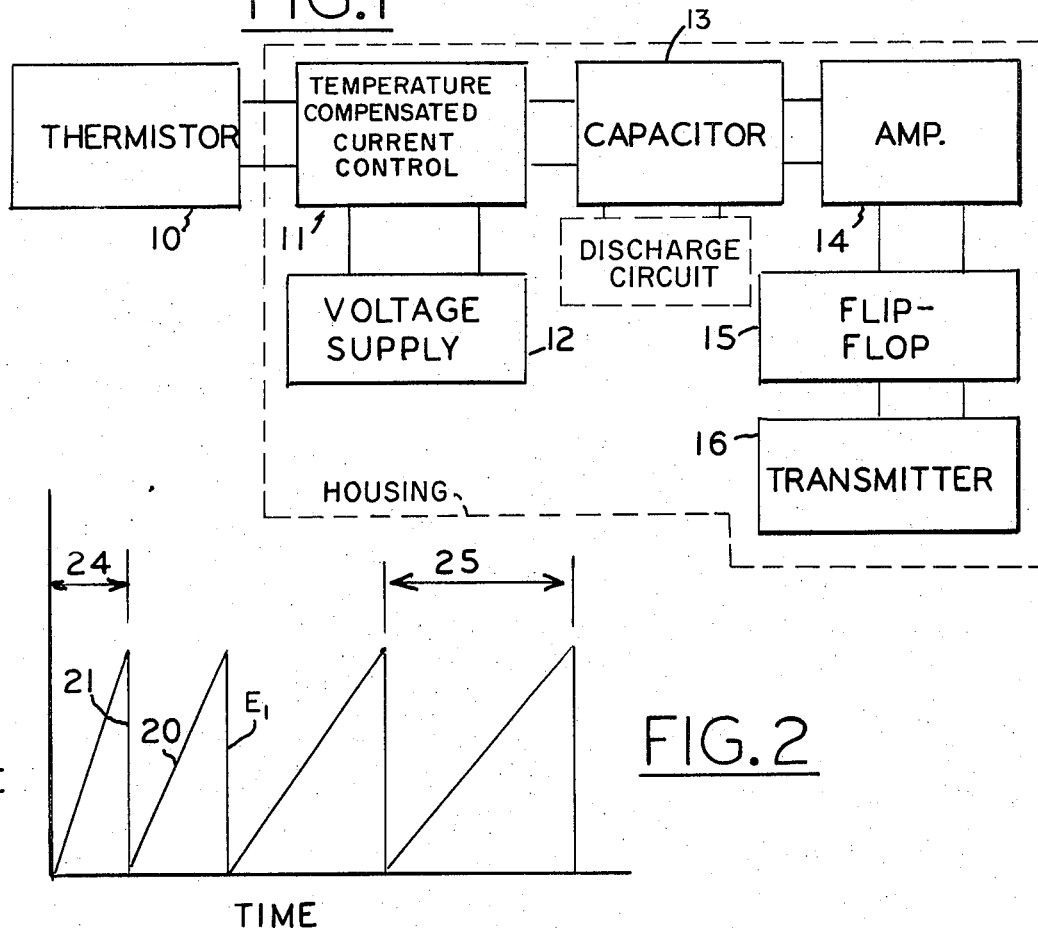
FIG.1
FIG.2
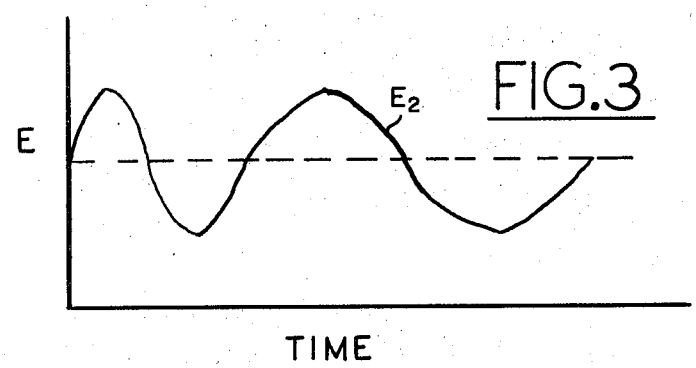
FIG.3

NEW TEMPERATURE SONDE

The invention described herein may be manufactured and used by or for the Government of the United States of America for governmental purposes without the payment of any royalties thereon or therefor.

The detailed vertical structure of temperature in the free atmosphere has been of interest to scientists for some time. Many devices for measuring temperature have been evolved and with the ongoing research programs and demands of the scientific community, plus the desire of the researchers in the field, have led to demands for increased sensitivity in temperature sensing devices with an increase in the number of readings per vertical mile.

The continuous measurement of temperature during ascent provides information on temperature structure at intermediate scales that has been summarized statistically by spectral analysis. Perhaps more important than the statistics of the temperature structure is the observation that both the stable stratosphere and relatively unstable troposphere contain numerous shallow layers with near adiabatic lapse rates. Although, in the experiments conducted with the improved temperature sonde of this disclosure, the altitude was not measured with the same precision as temperatures on these soundings (and, of course, altitude accuracy is equally important as temperature accuracy in a measurement of lapse rate), many of the observations of unstable layers were made in intervals of uniform balloon ascent and where fluctuations in stability cannot be attributed to errors in altitude.

Experimental details of the sonde varied from flight to flight. In one sample ascent made with the version of the sonde described in this disclosure the continuous temperature trace actually represented approximately one thousand independent temperature samples per kilometer. This large number of data points is necessarily processed and plotted directly by computer from the telemetered record.

The soundings show an unusually warm and relatively unstable tropospheric air mass over Minnesota for midwinter. The lapse rate in the troposphere averaged almost 8 deg km$^{-1}$. At the plotting scale no appreciably greater structure was evident in the sounding made with the fast response thermistor as compared to the sounding made with the GMD rod thermistor. The systematic difference of about 1° C between the sounds in the stratosphere is attributed to the difference in the two thermistor calibration procedures. GMD temperatures were obtained from the standard slide rule nomogram relation which converts an observation of frequency to temperature. The zero is adjusted by setting the scale to the appropriate temperature of a calibration chamber in what is called the baseline check. Laboratory calibration of the rod thermistor indicated that the temperatures read from the nomogram set with the baseline temperature were too high by approximately one degree at −60° C. In the experimental sonde the temperature-frequency relation of the modulator circuit was constant and the frequency record is converted to temperature by a numerical interpolation of the calibration data.

In view of the low average tropospheric stability it is not surprising that the sounding exhibited more unstable layers than usual. 12 layers, each more than 100 meters deep and with a lapse rate greater than 9.6 deg km$^{-1}$ were identified. Most of these layers appear equally unstable on the GMD sounding but this temperature record suffers so many interruptions by the baroswitch, the limits of the unstable layers are not as well defined.

One of the deeper unstable layers as measured by both thermistors on a balloon ascended at a regular rate during the measurement in this layer and the error in lapse rate due to error in altitude is estimated to be less than 2 percent. Other unstable layers also appeared in both temperature records but the balloon ascent rate also fluctuated here and the error in the measured lapse rate is considerably larger than in the deeper unstable layer.

The St. Cloud sounding for 00 GMT of Jan. 21 was an observation made about one hour earlier than the experimental sounding and approximately 60 miles northwest of the University launch site in Minneapolis. Comparisons support the observation by Danielsen (1959) and Soumi et al. (1967) that the rod thermistor is capable of resolving much more intermediate scale temperature structure than is actually extracted in current radiosonde observing and coding procedures.

It is therefore an object of this invention to provide an improved temperature sensing device for atmospheric temperature measurement.

It is a further object of this invention to provide an improved radio sonde device for taking variable temperature readings in the atmosphere on vertical ascent of balloon borne equipment.

And yet a further object of this invention is to provide an improved temperature sensing device for generating a frequency modulated signal related to the temperature thru which the device is travelling comprising; a thermistor; a housing incorporating the necessary circuitry to generate a frequency modulated radio signal; means for remotely mounting the thermistor from the housing; and circuitry in the housing including a temperature compensated transistor circuit coupled to have the variable resistance of the thermistor control current flow thru the temperature compensated transistor and coupled to a constant voltage supply, the circuit including a temperature stable capacitor chargeable by the temperature compensated transistors to a pre-determined voltage, the voltage determined by a transistor circuit which allows for rapid discharge of the capacitor upon charging to a pre-determined voltage, means in the circuit to amplify the charge-discharge signal of the capacitor and to actuate a flip-flop circuit thereby; the flip-flop circuit operating at a rate related to the temperature sensed by the thermistor, the output of the flip-flop circuit coupled to frequency modulate the output of a radio transmitter to broadcast a signal that is frequency modulated in relationship to the temperature sensed by the thermistor.

Other objects, advantages and novel features of the invention will become apparent from the following detailed description of the invention when considered in conjunction with the accompanying drawings wherein:

FIG. 1 is a block diagram of the invention.

FIG. 2 is the voltage curve of the charge-discharge cycle of the capacitor in the circuit.

FIG. 3 shows the frequency modulated transmitted signal; and

Figure 4:
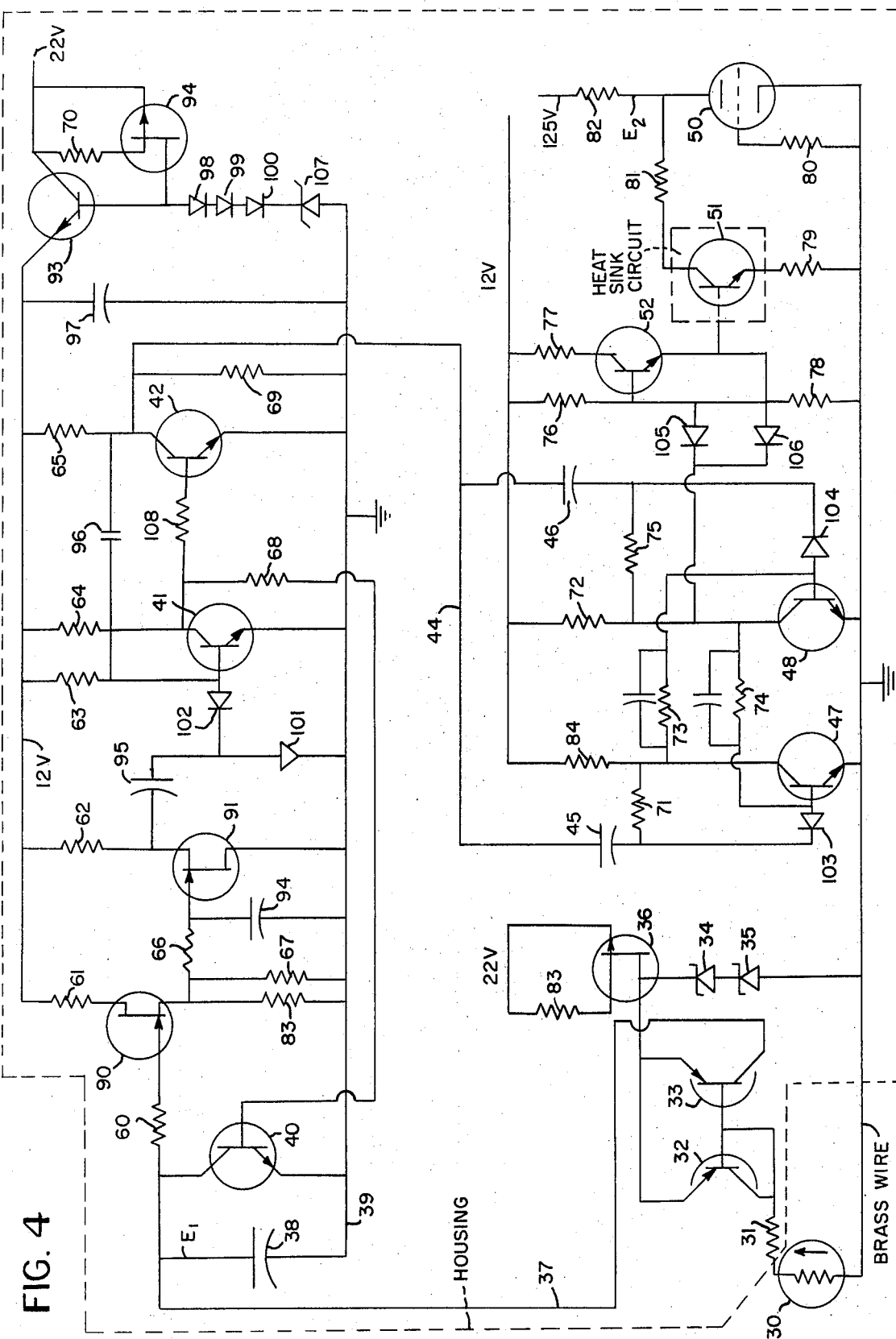
FIG. 4 is a detailed circuit of one embodiment of the invention.

Block 10 represents the thermistor for sensing the ambient temperature on the vertical sounding. As the temperature changes about the thermistor a variable signal is generated due to the change in resistance of the thermistor and is fed to block 11 which includes a pair of temperature compensated PN transistors. Block 12 represents a regulated power supply for controlling the voltages applied to the temperature compensated PN transistors. The ouptut of 11 is fed to a temperature stable capacitor which is charged to a pre-determined voltage and then rapidly discharged. The rate of the charge placed upon the capacitor is determined by the rate of current flow thru the transistor which in turn has a varying resistance depending upon its temperature. The charge-discharge signal of the capacitor 13 is connected thru suitable amplifier circuits for isolation and amplification to a flip-flop circuit 15 to cause the flip-flop circuit to be acuated at the rate of the charge-discharge of the capacitor 13. The signal from the flip-flop circuit is used to frequency modulate a transmitter 16. Thus the signal transmitted from the transmitter is a frequency modulated signal whose modulation rate is directly related to the temperature of the atmosphere thru which the unit is passing.

FIG. 2 shows the vertical axis as voltage and the horizontal axis is time and the curve represents the charge-discharge of capacitor 13. The rise time designated by 20 and the discharge time represented by 21 shows in the variation of the time base the variations in temperature. Towards the left hand side of the graph the time represented by the period 24 is shorter than the time of the right hand side represented by 25 and would indicate a temperature reading on the left hand side compared to that of the right hand side, when the thermistor has an increase in resistance with increase in ambient temperature.

FIG. 3 represents the frequency modulated signal output of transmitter 16.

FIG. 4 is a detailed schematic drawing of one embodiment of the invention. The thermistor 30 is coupled thru resistor 31 to a pair of temperature compensated PN transistors. The thermistor, a GA 51 L3 B thermistor is mounted about half a meter from the housing including the transmitter package at the end of a small rod. The entire package is air borne by a balloon or other device for taking the measurements which has not been shown for the sake of clarity. The connections to the thermistor are made by 5-mil-diameter brass wire to thermally isolate the thermistor from the rod and package.

As the thermistor passes thru different altitudes it encounters different ambient temperatures and its resistance varies according to the change in temperatures. Thus the current thru the circuit consisting of the thermistor 30 resistor 31 and temperature compensated transistors 32 and 33 varies.

A pair of zener diodes 34 and 35 are connected in the circuit to a transistor 36 which is coupled to a 22 volt supply bus. Transistor 33 is connected via line 37 to one side of a temperature compensated capacitor 38, the other side of which is connected to ground bus 39.

The capacitor 38 charges at a rate determined by the current flow thru thermistor 30. After it charges to a voltage pre-determined by transistor 40, transistor 40 rapidly discharges the capacitor 38. Transistors 41 and 42 serve as power amplifiers and isolators to generate a signal related to the charge-discharge cycle of capacitor 38 and the saw tooth wave of FIG. 2 related to the charge-discharge rate of capacitor 38 is coupled via line 44 thru capacitor 45 and 46 to the flip-flop circuit including transistors 47, 48.

Each discharge of the capacitor 38 causes the flip-flop circuit to change from one state to another and rate of change of this signal is used to frequency modulate the GMD output tube 50. A heat sink transistor circuit 51 is provided coupled to amplifier circuit including transistor 52 to aid in this frequency modulation.

Additional elements in this circuit have been identified for the purpose of giving normal values so that those skilled in the art may practice the invention. These items are numbered in FIG. 4 and their values are reproduced as follows:

| | |
|---|---|
| 30 - THERMISTOR | GA51L3 |
| 31 - RESISTOR | 1K |
| 32 - TRANSISTOR | SE4902 |
| 33 - TRANSISTOR | SE4902 |
| 34 - ZENER DIODE | MCR 2225 |
| 35 - ZENER DIODE | MCR 2225 |
| 36 - TRANSISTOR | 2N4360 |
| 38 - CONDENSOR | 47 pf CORNING CYFM |
| 40 - TRANSISTOR | EN2222 |
| 41 - TRANSISTOR | EN2369A |
| 42 - TRANSISTOR | EN2369A |
| 45 - CAPACITOR | 220 pf |
| 46 - CAPACITOR | 220 pf |
| 47 - TRANSISTOR | EN2369A |
| 48 - TRANSISTOR | EN2369A |
| 50 - OUTPUT TUBE | GMD |
| 51 - TRANSISTOR | 2N3440 |
| 60 - RESISTOR | 10K ohms |
| 61 - RESISTOR | 470 ohms |
| 62 - RESISTOR | SELECTED FOR MIN TEMP DRIFT |
| 63 - RESISTOR | 47K ohms |
| 64 - RESISTOR | 10K ohms |
| 65 - RESISTOR | 12K ohms |
| 66 - RESISTOR | 27K ohms |
| 67 - RESISTOR | SELECTED FOR ZERO DRIFT |
| 68 - RESISTOR | 10K ohms |
| 69 - RESISTOR | 47K ohms |
| 70 - RESISTOR | 1K ohms |
| 71 - RESISTOR | 39K ohms |
| 72 - RESISTOR | 15K ohms |
| 73 - RESISTOR | 39K ohms |
| 74 - RESISTOR | 39K ohms |
| 75 - RESISTOR | 39K ohms |
| 76 - RESISTOR | 12K ohms |
| 77 - RESISTOR | 1K ohms |
| 78 - RESISTOR | 8.2K ohms |
| 79 - RESISTOR | 330 ohms ½ watt |
| 80 - RESISTOR | 2.2K ohms |
| 81 - RESISTOR | 1K ohms ½ watt |
| 82 - RESISTOR | 330 ohms ½ watt |
| 83 - RESISTOR | SELECTED FOR ZERO DRIFT |
| 84 - RESISTOR | 15K ohms |
| 90 - TRANSISTOR | 2N4220 |
| 91 - TRANSISTOR | 2N4852 |
| 92 - TRANSISTOR | MHT5008 |
| 93 - TRANSISTOR | 2N 4360 |
| 94 - CAPACITOR | 50 pf |
| 95 - CAPACITOR | .001 uf |
| 96 - CAPACITOR | 120 pf |
| 97 - CAPACITOR | 22 uf |
| 98 - DIODES | IN 4154 |
| 99 - DIODES | IN 4154 |
| 100 - DIODES | IN 4154 |
| 101 - DIODES | IN 4154 |
| 102 - DIODES | IN 4154 |
| 103 - DIODES | IN 4154 |
| 104 - DIODES | IN 4154 |
| 105 - DIODES | IN 4154 |
| 106 - DIODES | IN 4154 |
| 107 - DIODES | IN 962B |
| 108 - RESISTOR | 10K ohms |

I claim:

1. An improved temperature sensing device for generating a frequency modulated signal related to the temperature thru which the device is travelling comprising:

a. a thermistor;
b. a housing incorporating the necessary circuitry to generate a frequency modulated radio signal;
c. means for remotely mounting said thermistor from said housing; and
d. circuitry in said housing including a temperature compensated transistor circuit coupled to have the variable resistance of said thermistor control current flow thru said temperature compensated transistors and coupled to a constant voltage supply, said circuit including a temperature stable capacitor chargeable by said temperature compensated transistors to a pre-determined voltage, said voltage determined by a transistor circuit which allows for rapid discharge of said capacitor upon changing to said pre-determined voltage, means in said circuit to amplify said charge-discharge signal of said capacitor and to actuate a flip-flop circuit thereby, said flip-flop circuit operating at a rate related to the temperature sensed by said thermistor, the output of said flip-flop circuit coupled to frequency modulate the output of a radio transmitter to broadcast a signal that is frequency modulated in relationship to the temperature sensed by said thermistor.

2. The device of claim 1 wherein there is included between said flip-flop circuit and said output transmitter tube, a heat sink circuit.

3. The device of claim 2 wherein said thermistor is connected to said circuitry thru brass wire thermally isolating said thermistor from said housing.

4. The device of claim 3 wherein said thermistor is mounted at least 50 centimeters from said housing to place said thermistor within the area to be sampled and removing it from heat sources within said housing.

* * * * *